United States Patent
Nainar et al.

(10) Patent No.: US 9,237,078 B1
(45) Date of Patent: Jan. 12, 2016

(54) PATH VALIDATION IN SEGMENT ROUTING NETWORKS

(71) Applicant: CISCO TECHNOLOGY, INC., San Jose, CA (US)

(72) Inventors: Nagendra Kumar Nainar, Morrisville, NC (US); Carlos M. Pignataro, Raleigh, NC (US); Nobushige Akiya, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 30 days.

(21) Appl. No.: 14/315,570

(22) Filed: Jun. 26, 2014

(51) Int. Cl.
*H04L 12/26* (2006.01)
*H04L 12/70* (2013.01)

(52) U.S. Cl.
CPC ..... *H04L 43/0811* (2013.01); *H04L 2012/5625* (2013.01)

(58) Field of Classification Search
CPC ............... H04L 43/0811; H04L 2012/5625
See application file for complete search history.

(56) References Cited

U.S. PATENT DOCUMENTS

| | | | |
|---|---|---|---|
| 2014/0098675 A1 | 4/2014 | Frost et al. | |
| 2014/0169370 A1* | 6/2014 | Filsfils | H04L 69/166 370/392 |
| 2014/0254596 A1* | 9/2014 | Filsfils | H04L 45/745 370/392 |
| 2014/0269266 A1* | 9/2014 | Filsfils | H04L 43/50 370/228 |
| 2014/0269727 A1* | 9/2014 | Filsfils | H04L 41/12 370/392 |
| 2014/0317259 A1* | 10/2014 | Previdi | H04L 61/30 709/223 |
| 2014/0341222 A1* | 11/2014 | Filsfils | H04L 45/507 370/395.5 |
| 2014/0369356 A1* | 12/2014 | Bryant | H04L 45/745 370/392 |
| 2015/0030020 A1* | 1/2015 | Kini | H04L 45/50 370/389 |
| 2015/0256456 A1* | 9/2015 | Previdi | H04L 45/745 370/392 |

OTHER PUBLICATIONS

IETF Draft, "Use case for a scalable and topology aware MPLS data plane monitoring system", draft-geib-spring-cam-usecase-01, R. Geib et al., Feb. 5, 2014.
IETF Draft, "Segment Routing Architecture", draft-filsfils-rtgwg-segment-routing-01, C. FIlsfils et al., Oct. 21, 2013.
IEFT Draft, "Segment Routing Architecture", draft-filsfils-spring-segment-routing-oo, C. Filsfils et al., Apr. 23, 2014.
IETF Draft, "Segment Routing with MPLS data plane", draft-filsfils-spring-segment-routing-mpls-01. C. Filsfils et al., Apr. 18, 2014.
IETF Draft, "IS-IS Extensions for Segment Routing", draft-ietf-isis-segment-routing-extensions-00, S. Previdi et al., Apr. 11, 2014.

* cited by examiner

*Primary Examiner* — Clemence Han
(74) *Attorney, Agent, or Firm* — Cindy Kaplan

(57) ABSTRACT

In one embodiment, a method includes generating a path validation packet at a network device, the path validation packet including a plurality of segment identifiers for use in segment routing and an operations, administration, and management (OAM) segment identifier for use in path validation, transmitting from the network device the path validation packet on a path having a plurality of routers associated with the segment identifiers, one of the routers associated with the OAM segment identifier, and validating the path if a return path validation packet is received. An apparatus is also disclosed herein.

20 Claims, 4 Drawing Sheets

PATH VALIDATION IN SEGMENT ROUTING NETWORKS

TECHNICAL FIELD

The present disclosure relates generally to communications networks, and more particularly, to path validation in segment routing networks.

BACKGROUND

Segment routing (SR) allows a node to steer a packet through a set of segments. Rather than depending on a hop-by-hop signaling technique, SR depends on a set of segments that are advertised by a routing protocol. These segments act as topological sub-paths that can be combined together to form a desired path.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
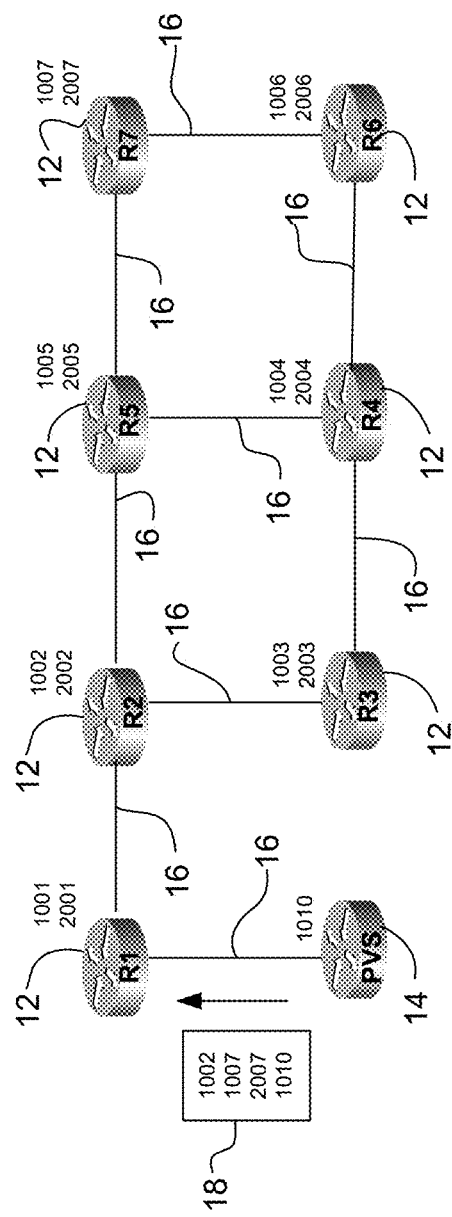
FIG. 1 illustrates an example of a network in which embodiments described herein may be implemented.

In one embodiment, a method generally comprises generating a path validation packet at a network device, the path validation packet comprising a plurality of segment identifiers for use in segment routing and an operations, administration, and management (OAM) segment identifier for use in path validation, transmitting from the network device, the path validation packet on a path comprising a plurality of routers associated with the segment identifiers, one of the routers associated with the OAM segment identifier, and validating the path if a return path validation packet is received.

In another embodiment, a method generally comprises receiving a path validation packet at a router in a path, the path validation packet comprising a segment stack comprising a plurality of segment identifiers associated with a plurality of routers in the path, identifying at the router an operations, administration, and maintenance (OAM) segment identifier at a top of the segment stack, and forwarding the packet only if the OAM segment identifier corresponds to an OAM segment identifier associated with the router.

In another embodiment, an apparatus generally comprises a processor for generating a path validation packet, the path validation packet comprising a plurality of segment identifiers for use in segment routing and an operations, administration, and management (OAM) segment identifier for use in path validation, transmitting the path validation packet on a path comprising a plurality of routers associated with the plurality of segment identifiers, one of the routers associated with the OAM segment identifier, and validating the path if a return path validation packet is received. The apparatus further comprises memory for storing the segment identifiers.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Segment routing (SR) allows for a flexible definition of end-to-end paths within routing protocols by encoding paths as sequences of topological sub-paths called segments. Segment routing specifies a path for a packet to take through a network using a stack of segment identifiers (SIDs). There are multiple use cases that benefit by the domain-wide uniqueness of the segment identifiers. One example is path monitoring. However, use of the SR segment identifiers in path monitoring may not identify all failures in a path when used for connectivity verification.

The embodiments described herein assign a globally unique identifier, referred to herein as an OAM (Operations, Administration, and Maintenance) segment identifier, to nodes in a network for use in path validation at the data plane. As described below, data plane validation is provided without the need for control plane intervention.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, or other network devices), which facilitate passage of data within the network.

The network shown in the example of FIG. 1 includes a plurality of routers 12 (R1, R2, R3, R4, R5, R6, R7) connected by links 16. The term 'router' as used herein may refer to any network device (e.g., router, switch/router) configured to perform routing functions. The routers 12 may be located in one or more networks and may include edge routers and core routers. In the example shown in FIG. 1, the routers 12 are in communication with a path validation server (PVS) 14. The path validation function may also be performed at one of the routers 12 or distributed among two or more routers 12 or other network devices in a path validation system.

The routers 12 are configured to perform segment routing, which specifies a path that a packet will take through the network using a stack of segment identifiers. In the example described herein, the routers are located in an MPLS (Multiprotocol Label Switching) network, in which packets are transmitted via a label switched path (LSP). Packets may enter the MPLS network via an ingress label edge router (LER), travel along an LSP of one or more core LSRs (Label Switch Routers), and exit via an egress LER. Segment routing may be directly applied to the MPLS data plane. Segment routing may also be applied to an IPv6 (Internet Protocol version 6) network.

In one embodiment of segment routing, a packet is encapsulated with a header that includes the stack of segment identifiers (SIDs). The packet and header are forwarded through the network based on the top most SID from the stack at each hop and forwarding the packet with the header to the next hop of the router that is mapped to the topmost SID. The SIDs may be used to identify node segments, adjacency segments, or both types of segments. A node segment identifies the node and the prefix to which it is assigned. It is globally significant and may also be referred to as a global segment since it is unique among nodes. An adjacency segment represents the local segment to a specific IGP adjacency and may also be referred to as a local segment since it does not have to be unique among nodes. The SID may be, for example, 20 bits or 128 bits, or any other suitable size.

In the example shown in FIG. 1, router R1 is assigned an SID of 1001, R2 1002, R3 1003, R4 1004, R5 1005, R6 1006, R7 1007, and the PVS is assigned an SID of 1010.

In one example, the SR header includes a source route encoded as an ordered list of segments, a pointer identifying the next segment to process, and identification of the ingress and egress SR edge routers on the path of the packet. An instruction (e.g., topological instruction) associated with a global segment is recognized and executed by any SR-capable node in the domain. The instruction associated with a local segment is supported by the node that originates the instruction. In certain embodiments, per-flow state for a packet flow entering an SR domain at an ingress SR edge router only needs to be maintained by the ingress SR edge router.

The routers 12 may use the SID to transmit data packets via a path that goes through one or more routers. The PVS 14 or one or more of the routers 12 may also be capable of generating management packets for transmission to other routers in the network to measure or monitor specific paths within the network. The PVS 14 or router 12 may attach a stack of SIDs to the packet that corresponds to the selected path. The stack of SIDs tells the routers 12 in the path how to route the packet to its destination.

The PVS 14 may send, for example, a monitoring packet with a segment stack <1002><1007><1010> to monitor an LSP between R2 and R7 (FIG. 1). In this case, PVS 14 sends the packet to router R1, which pops 1002 and sends the packet to R2. Router R2 sends the packet to R5, which pops 1007 and sends the packet to R7. Router R7 then sends the packet back to R1, through R5 and R2. Router R1 pops 1010 and sends the packet to PVS 14. Since there is no verification or validation procedure when using conventional SIDs, certain failures may not be detected. For example, router R2 may experience a programming corruption that causes it to pop 1007 and send the packet to R3. In this case, a path monitoring packet transmitted from the PVS 14 with segment stack <1002><1007><1010> will still result in a return packet (i.e., the same path monitoring packet returned) reaching the PVS, which will therefore assume that the path is active.

The embodiments described herein provide path validation by assigning a globally significant/unique segment to each node (referred to herein as the OAM segment). The OAM segment has a forwarding semantic of pop and forward based on the underlying label. This may allow the PVS 14 (or other node performing path validation function) to perform connectivity verification at the data plane without the need for control plane intervention.

It is to be understood that the term 'OAM segment' or 'OAM segment identifier' as used herein refers to any segment, segment identifier, or label unique within a domain, configured for use in path validation, and distinguishable from the conventional SR segment/segment identifier/label used in segment routing.

Referring again to the example shown in FIG. 1, node R1 has an OAM SID of 2001, node R2 has OAM SID of 2002, R3 has OAM SID of 2003, R4 has OAM SID of 2004, R5 has OAM SID of 2005, R6 has OAM SID of 2006, and R7 has an OAM SID of 2007. When generating a path validation packet, the PVS 14 includes at least one OAM SID in an appropriate location in the segment stack so that the respective node performs validation of the data packet at the data plane. For example, if PVS 14 wants to validate the LSP from R2 to R7 it pushes the segment stack <1002><1007><2007><1010>, as shown in packet 18 in FIG. 1. SID 1002 is a top label that identifies the ingress router R2, SID 1007 is the next label identifying the egress router R7, label 2007 is an OAM SID for node R7, and SID 1010 is a bottom label used to send the return packet back to the PVS 14.

The segment stack shown in FIG. 1 defines an LSP between R2 and R7 to be validated and uses egress node R7 to confirm proper connectivity throughout the path. The SIDs are used to route the packet through the LSP and the OAM SID provides path validation. When router R1 receives the packet 18, it pops 1002 and sends the packet to R2. Router R2 sends the packet to R5. Router R5 pops 1007 and sends the packet to R7. Router R7 validates the packet by searching its forwarding table for 2007. If segment 2007 is found in its local table, the router R7 pops 2007 and forwards the packet based on the underlying segment 1010. At this point, the steering part of the path validation is complete and the packet may be returned to the PVS 14. Router R7 sends the return path validation packet (i.e., forwarded path validation packet) back to R1 through R5 and R2. R1 pops 1010 and transmits the packet to the PVS 14.

If any transit node 12 inadvertently pops a label or forwards the packet to the wrong node, the OAM segment will prevent forwarding of the packet back to the PVS, in which case the PVS will identify the path as broken. For example, if router R2 incorrectly pops 1007 and sends the packet to R3, R3 will not recognize 2007 and drop the packet.

In one embodiment both the SID and OAM SID are advertised by link state routing protocols (e.g., IS-IS (Intermediate System to Intermediate System), OSPF (Open Shortest Path First)). The OAM segment may be advertised in a new TLV (type-length-value), for example. Each node that assigns the OAM SID should install only its own OAM SID in its local table and not the other OAM SIDS. The PVS 14 or other node in which the path validation function is performed, stores both the SID and OAM SID for use in path validation.

If a path to be validated is a single physical interface (or a bundle of connected interfaces) it can be expressed by the related adjacency segment. If the shortest path is to be validated, the node SID can be used.

In the example shown in FIG. 1, all routers are assigned OAM segments, however, not all nodes need to have an assigned OAM segment. For example, the unique OAM label assignment may be limited to edge nodes, which would allow the PVS 14 to validate a path between ingress and egress routers.

It is to be understood that the network shown in FIG. 1 is only an example and the embodiments described herein may be implemented in networks comprising different network topologies or network devices or using different network protocols, without departing from the scope of the embodiments. For example, the above cases use PHP (Penultimate Hop Popping) (e.g., R1 pops 1002, R5 pops 1007). In another example, UHP (Ultimate Hop Popping) may be used (e.g., R2 pops 1002, R7 pops 1007). The embodiments described herein may be used with PHP, UHP or other protocol.

Figure 2:
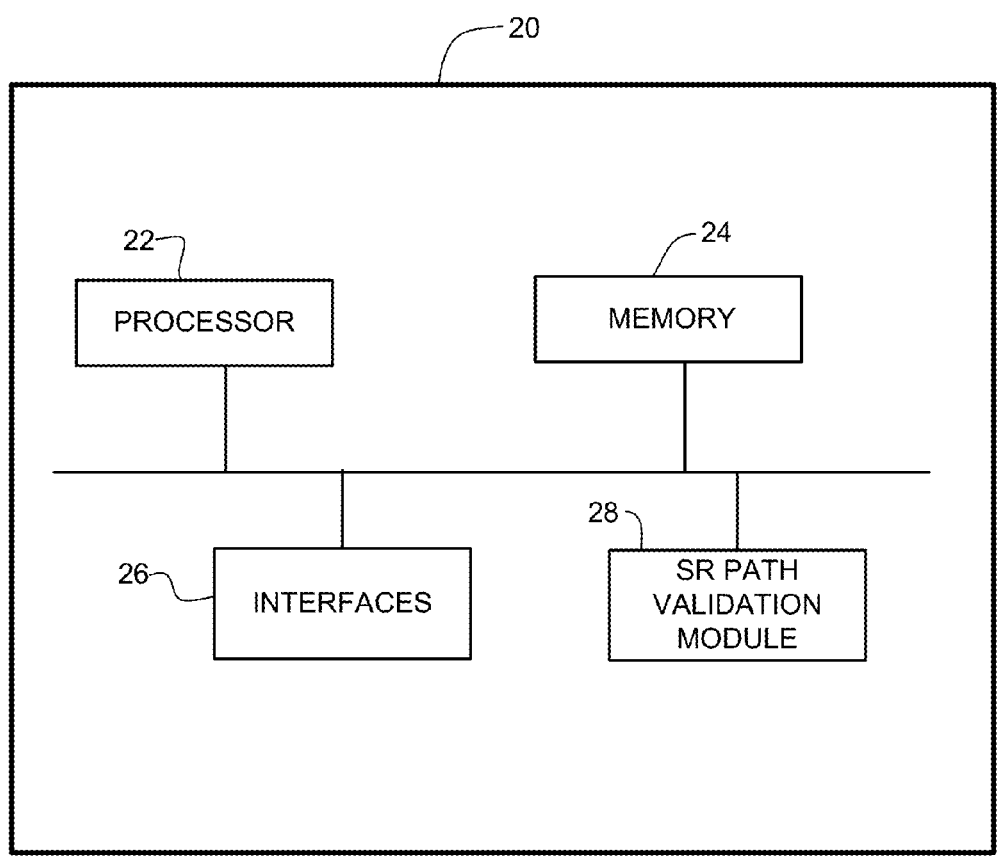
FIG. 2 depicts an example of a network device useful in implementing embodiments described herein.

FIG. 2 illustrates an example of a network device 20 that may be used to implement the embodiments described herein. In one embodiment, the network device is a programmable machine that may be implemented in hardware, software, or any combination thereof. The network device 20 includes one or more processor 22, memory 24, network interfaces 26, and SR path validation module 28.

Memory 24 may be a volatile memory or non-volatile storage, which stores various applications, operating systems, modules, and data for execution and use by the processor 22. For example, components of the SR path validation module 28 (e.g., code, logic, database, etc.) may be stored in the memory 24. Memory 24 may also include an SR database, routing table (e.g., routing information base (RIB)), forwarding table (e.g., forwarding information base (FIB)), or any other data structure for use in routing or forwarding packets. The network device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interfaces 26 may comprise any number of interfaces (linecards, ports) for receiving data or transmitting data to other devices. The network interface 26 may include, for example, an Ethernet interface for connection to a computer or network.

The SR path validation module 28 may be operable to generate segment and OAM segment identifiers for each node. As described above, each node may be assigned a segment identifier for use in routing packets along a path, and one or more nodes may be assigned an OAM segment identifier for use in path validation.

The network device 20 may also include an IGP (Interior Gateway Protocol) manager operable to generate link-state packets, for example. The link-state packets may be used to flood the network with information, including a table or other data that maps SIDs to neighbor identities (e.g., IP addresses or other identifier) or the communication links therebetween. The PVS 14 or routers 12 may use the mappings between SIDs and neighbor identities to create segment stacks.

It is to be understood that the network device 20 shown in FIG. 2 and described above is only an example and that different configurations of network devices may be used. For example, the network device 20 may further include any suitable combination of hardware, software, algorithms, processors, devices, components, or elements operable to facilitate the capabilities described herein.

Figure 3:
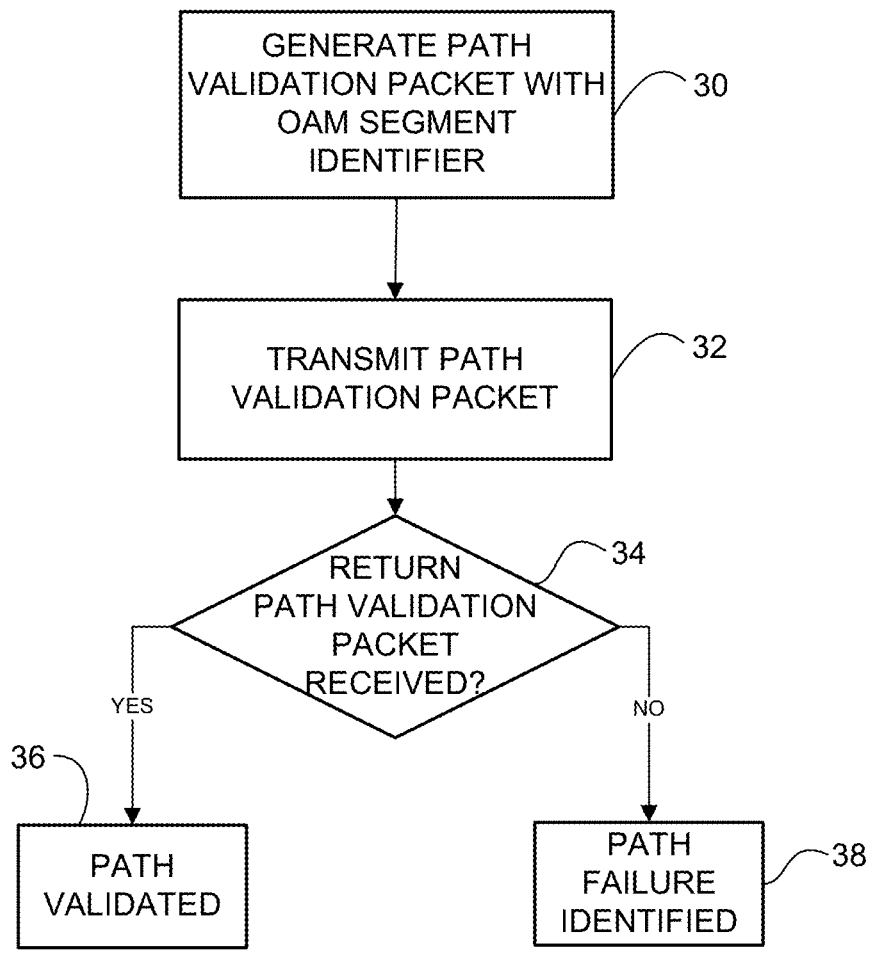
FIG. 3 is a flowchart illustrating a process for path validation at a path validation device, in accordance with one embodiment.

FIG. 3 is a flowchart illustrating an overview of a process for path validation in a segment routing network, in accordance with one embodiment. At step 30 a path validation packet (e.g., packet 18 in FIG. 1) may be generated at a network device. As described above, the path validation packet may be generated at the PVS 14, one of the routers 12, or other network device. The path validation packet may comprise a segment stack identifying the path that is to be validated. The segment stack may include a plurality of segment identifiers (SIDs) for use in segment routing and at least one OAM segment identifier for use in path validation. The path validation packet 18 may be a management packet, but may also be a data packet or any other suitable type of packet. The network device (e.g., PVS 14, router 12) may transmit the path validation packet on a path comprising a plurality of routers associated with the plurality of SIDs (step 32). At least one of the routers 12 may be associated with the OAM segment identifier. In certain embodiments, if the network device receives a return path validation packet, the path is validated (steps 34 and 36). The PVS 14 may identify a path failure if a return path validation packet is not received in a specified period of time (steps 34 and 38). The time period may be a specified interval or may be configurable or variable based on path length (e.g., number of hops). The PVS 14 may, for example, alert a network management system (node, console, network device) if the return packet is not received before a timeout.

As described above, the path validation system may reside at a single node (interface) of the domain to be monitored, in which case the path validation packets are transmitted and the return packets received at the same node. Path validation packets may also return to another specified node or interface in a distributed path validation system.

Figure 4:
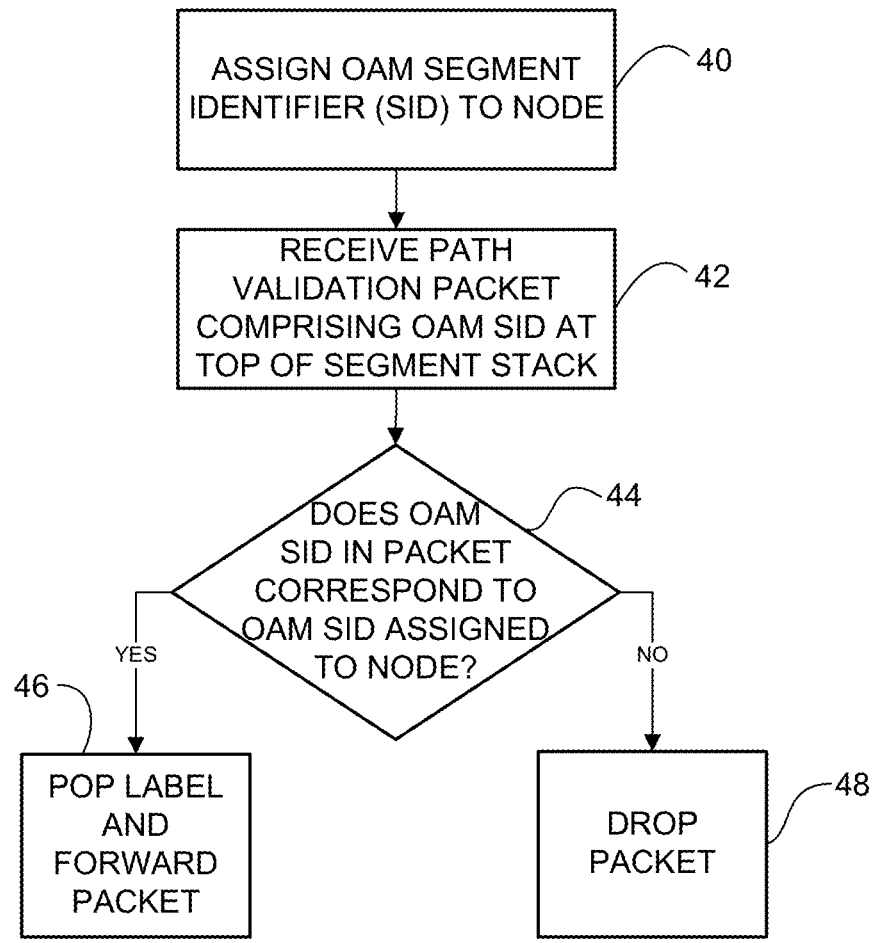
FIG. 4 is a flowchart illustrating a process for use in path validation at a network device within the path, in accordance with one embodiment.

FIG. 4 illustrates a process for path validation at one of the routers within the path being validated, in accordance with one embodiment. At step 40, an OAM segment identifier may be assigned to the node (e.g., router 12) located in the path. The router 12 may receive a path validation packet comprising a segment stack comprising a plurality of segment identifiers associated with a plurality of routers in the path. The router 12 may identify an OAM segment identifier at a top of the segment stack (step 42). In certain embodiments, if the OAM SID matches the node's assigned OAM SID (step 44), router 12 may pop the OAM SID and forward the packet based on the underlying segment (step 46). If the OAM SID does not match the node's assigned OAM SID (e.g., OAM SID is not found in local forwarding table), the packet may be dropped (step 48). In this case, the PVS 14 does not receive a return path validation packet and therefore identifies a failure in the path.

It is to be understood that the flowcharts shown in FIGS. 3 and 4 and described above are only examples and that steps may be added, combined, removed, or modified, without departing from the scope of the embodiments.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   generating a path validation packet at a network device, the path validation packet comprising a plurality of segment identifiers for use in segment routing and an operations, administration, and management (OAM) segment identifier for use in path validation;
   transmitting from the network device, the path validation packet on a path comprising a plurality of routers associated with said plurality of segment identifiers, wherein one of the routers is associated with the OAM segment identifier; and
   validating said path if a return path validation packet is received.

2. The method of claim 1 wherein the OAM segment identifier is a globally unique label.

3. The method of claim 1 further comprising transmitting a failure notification if the return path validation packet is not received in a specified period of time.

4. The method of claim 1 wherein the network device comprises a path validation server.

5. The method of claim 1 wherein the network device comprises a router.

6. The method of claim 1 further comprising receiving the return path validation packet at the network device and verifying connectivity to an egress router in said plurality of routers.

7. The method of claim 1 wherein the OAM segment identifier is associated with an egress router in said plurality of routers.

8. A method comprising:
   receiving a path validation packet at a router in a path, the path validation packet comprising a segment stack comprising a plurality of segment identifiers associated with a plurality of routers in said path;
   identifying at the router, an operations, administration, and maintenance (OAM) segment identifier at a top of said segment stack; and
   forwarding the packet only if the OAM segment identifier corresponds to an OAM segment identifier associated with the router.

9. The method of claim 8 wherein the OAM segment identifier is a globally unique label.

10. The method of claim 8 wherein the path validation packet is received from a path validation server.

11. The method of claim 8 further comprising searching a local database for the OAM segment identifier in said segment stack.

12. The method of claim 8 wherein forwarding the packet comprises forwarding the packet based on an underlying segment identifier in said segment stack.

13. The method of claim 8 wherein the router is an egress router for said path.

14. An apparatus comprising:
   a processor for generating a path validation packet, the path validation packet comprising a plurality of segment identifiers for use in segment routing and an operations, administration, and management (OAM) segment identifier for use in path validation, transmitting the path validation packet on a path comprising a plurality of routers associated with said plurality of segment identifiers, and validating said path if a return path validation packet is received; and
   memory for storing said segment identifiers;
   wherein one of the routers is associated with the OAM segment identifier.

15. The apparatus of claim 14 wherein the OAM segment identifier is a globally unique label.

16. The apparatus of claim 14 wherein the processor is further operable to transmit a failure notification if the return path validation packet is not received in a specified period of time.

17. The apparatus of claim 14 wherein the apparatus comprises a path validation server.

18. The apparatus of claim 14 wherein the apparatus comprises a router.

19. The apparatus of claim 14 wherein the processor is further configured to verify connectivity to an egress router in said plurality of routers upon receiving the return path validation packet.

20. The apparatus of claim 14 wherein the OAM segment identifier is associated with an egress router in said plurality of routers.

\* \* \* \* \*